United States Patent
Zhou (10) Patent No.: US 9,007,428 B2
(45) Date of Patent: Apr. 14, 2015

(54) MOTION-BASED IMAGE STITCHING

(75) Inventor: Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 976 days.

(21) Appl. No.: 13/151,105

(22) Filed: Jun. 1, 2011

(65) Prior Publication Data

US 2012/0306999 A1 Dec. 6, 2012

(51) Int. Cl.
*H04N 5/262* (2006.01)
*H04N 5/232* (2006.01)

(52) U.S. Cl.
CPC ......... *H04N 5/23238* (2013.01); *H04N 5/2624* (2013.01)

(58) Field of Classification Search
CPC .................... H04N 5/2624; H04N 5/23238
USPC ........................................................ 348/36
See application file for complete search history.

(56) References Cited

U.S. PATENT DOCUMENTS

| | | | |
|---|---|---|---|
| 6,075,905 A * | 6/2000 | Herman et al. ............... 382/284 |
| 6,304,284 B1 * | 10/2001 | Dunton et al. .................. 348/36 |
| 6,335,754 B1 * | 1/2002 | Endo et al. ...................... 348/37 |
| 6,424,752 B1 * | 7/2002 | Katayama et al. ............ 382/284 |
| 6,618,511 B1 | 9/2003 | Mancuso et al. |
| 7,382,400 B2 | 6/2008 | Sablak |
| 7,574,122 B2 | 8/2009 | Fukumoto et al. |
| 7,576,778 B2 | 8/2009 | Hirota et al. |
| 7,705,885 B2 | 4/2010 | Prieto et al. |
| 7,720,353 B1 * | 5/2010 | Jouppi ........................... 386/241 |
| 8,208,792 B2 * | 6/2012 | Morioka et al. .............. 386/248 |
| 8,526,762 B2 * | 9/2013 | Cooper .......................... 382/294 |
| 8,600,194 B2 * | 12/2013 | Doepke .......................... 382/294 |
| 8,698,875 B2 * | 4/2014 | Anguelov et al. ............... 348/36 |
| 2004/0130626 A1 * | 7/2004 | Ouchi et al. ................ 348/207.1 |
| 2006/0072176 A1 * | 4/2006 | Silverstein et al. ........... 358/540 |
| 2007/0081081 A1 | 4/2007 | Cheng |
| 2007/0285562 A1 | 12/2007 | Raynor |
| 2009/0208062 A1 | 8/2009 | Sorek et al. |
| 2010/0054627 A1 * | 3/2010 | Rosenberg .................... 382/284 |
| 2010/0194852 A1 | 8/2010 | Tseng et al. |
| 2011/0228112 A1 * | 9/2011 | Kaheel et al. .............. 348/208.4 |

(Continued)

FOREIGN PATENT DOCUMENTS

JP 2003-179800 * 6/2003

OTHER PUBLICATIONS

Meingast, Marci, et al., "Geometric Models of Rolling-Shutter Cameras", EECS Department, University of California Berkley, Mar. 29, 2005.

(Continued)

*Primary Examiner* — David Harvey
(74) *Attorney, Agent, or Firm* — Kenyon & Kenyon LLP (57) ABSTRACT

Systems, methods, and computer readable media for stitching or aligning multiple images (or portions of images) to generate a panoramic image are described. In general, techniques are disclosed for using motion data (captured at substantially the same time as image data) to align images rather than performing image analysis and/or registration operations. More particularly, motion data may be used to identify the rotational change between successive images. The identified rotational change, in turn, may be used to generate a transform that, when applied to an image allows it to be aligned with a previously captured image. In this way, images may be aligned in real-time using only motion data.

24 Claims, 10 Drawing Sheets

(56) References Cited

U.S. PATENT DOCUMENTS

2012/0300019 A1* 11/2012 Yang et al. .................... 348/36
2014/0086494 A1* 3/2014 Benhimane et al. .......... 382/215

OTHER PUBLICATIONS

Chang, Li-Wen, et al., "Analysis and Compensation of Rolling Shutter Effect for CMOS Image Sensors", IEEE Transactions on Image Processing, vol. 17:8, pp. 1323-1330, Aug. 2008.

Forssen, Per-Erik, et al., "Rectifying rolling shutter video from handheld devices", 2010 IEEE Conference on Computer Vision and Pattern Recognition (CVPR), San Francisco CA, pp. 507-514, Jun. 13-18, 2010.

Heflin, Brian, et al., "Correcting Rolling-Shutter Distortion of CMOS Sensors using Facial Feature Detection", 2010 Fourth IEEE International Conference on Biometrics: Theory Applications and Systems (BTAS), Washington DC, pp. 1-6, Sep. 27-29, 2010.

Chun, Jung-Bum, et al., "Suppressing Rolling-Shutter Distortion of CMOS Image Sensors by Motion Vector Detection", IEEE Transactions on Consumer Electronics, vol. 54:4, pp. 1479-1487, Nov. 2008.

RollingShutter 1.1 User Guide for After Effects, The Foundry Visionmongers Ltd., 34 pgs., 2011.

Bradley, Derek, et al., "Synchronization and Rolling Shutter Compensation for Consumer Video Camera Arrays", IEEE Computer Society Conference on Computer Vision and Pattern Recognition Workshops, Miami FL pp. 1-8, Jun. 20-25, 2009.

Nishino, Ko, "Introduction to Computer Vision", Week 2, Fall 2010.

PhotoSolid® Image Stabilization Technology by Morpho, Inc., http://www.morphoinc.com/en/products/PhotoSolid.html, 2 pages, 2011.

MovieSolid® Motion Stabilization Technology by Morpho, Inc., http://www.morphoinc.com/en/products/MovieSolid.html, 1 page, 2011.

* cited by examiner

MOTION-BASED IMAGE STITCHING

BACKGROUND

This disclosure relates generally to the field of image processing. More particularly, but not by way of limitation, this disclosure relates to techniques for improving real-time panoramic photography processing using motion data (e.g., gyroscopic sensor input).

Panoramic photography may be defined generally as a photographic technique for capturing images with elongated fields of view. An image showing a field of view approximating, or greater than, that of the human eye, e.g., about 160° wide by 75° high, is usually termed "panoramic." Thus, panoramic images generally have an aspect ratio of at least 2:1, meaning that the image is at least twice as wide as it is high (or, conversely, twice as high as it is wide, in the case of vertical panoramic images). In some embodiments, panoramic images may even cover fields of view of up to 360 degrees, i.e., a "full rotation" panoramic image.

There are many challenges associated with taking visually appealing panoramic images. These challenges include photographic problems such as: difficulty in determining appropriate exposure settings caused by differences in lighting conditions across the panoramic scene; blurring across the seams of images caused by motion of objects within the panoramic scene; parallax problems (i.e., problems caused by the apparent displacement or difference in the apparent position of an object in the panoramic scene as the image capture device is panned); properly aligning the various images used to construct the overall panoramic image; blending between the overlapping regions of various images used to construct the overall panoramic image; choosing an image projection correction that does not distort photographically important parts of the panoramic photograph (e.g., rectangular, cylindrical, Mercator); and correcting for perspective changes between subsequently captured images.

Some prior art panoramic photography systems may utilize gyroscopic information to assist in image analysis and registration. As the number of images within a given time period that are aligned to generate a panoramic image increases, however, the computational costs of performing image analysis and registration can become prohibitive. This may be particularly true for image capture devices embedded in handheld electronic devices such as mobile phones, personal data assistants (PDAs), portable music players, digital cameras, as well as laptop and tablet computer systems.

SUMMARY

In one embodiment the invention provides a method to align or stitch together digital images without analyzing the image or performing standard image registration (both computationally expensive operations). The method includes obtaining a first image from an image capture device (e.g., a digital camera), the image capture device having one or more image capture parameters (e.g., focal length and principal point), the image capture parameters having first values for the first image. At substantially the same time, motion information for the first image may be obtained (e.g., from a gyroscopic and/or accelerometer sensors). A second image may then be obtained having second image capture parameter values. As with the first image, motion data for the second image may be obtained at substantially the same time that the second image is obtained. Relative motion between the two images (i.e., due to motion of the image capture device) may be determined. The second image may then be aligned with the first image using the first and second image capture parameter values and the determined relative motion. It is significant that the two images may be aligned without the need to analyze the images.

When motion data comes from a gyroscopic sensor, the motion data for each image may be integrated to obtain instantaneous position information. This position information may be used to determine the relative motion between the two images. In another embodiment, the image capture parameter values may be used to determine intrinsic matrices for each image. These matrices, and the determined relative motion between the two images, may be used to generate a perspective transform matrix. Applying the perspective transform to the second image permits it to be aligned with the first image The disclosed methods may be embodied in program code and stored on a non-transitory storage medium. The stored program code may be executed by a programmable control device that is part of, or controls, an image capture device.

DETAILED DESCRIPTION

This disclosure pertains to systems, methods, and computer readable media for stitching or aligning multiple images (or portions of images) to generate a panoramic image. In general, techniques are disclosed for using motion data (captured at substantially the same time as image data) to align images rather than performing image analysis and/or registration operations. More particularly, motion data may be used to identify the rotational change between successive images. The identified rotational change, in turn, may be used to generate a transform that, when applied to an image allows it to be aligned with a previously captured image. In this way, images may be aligned in real-time using only motion data.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the image processing field having the benefit of this disclosure.

Figure 1:
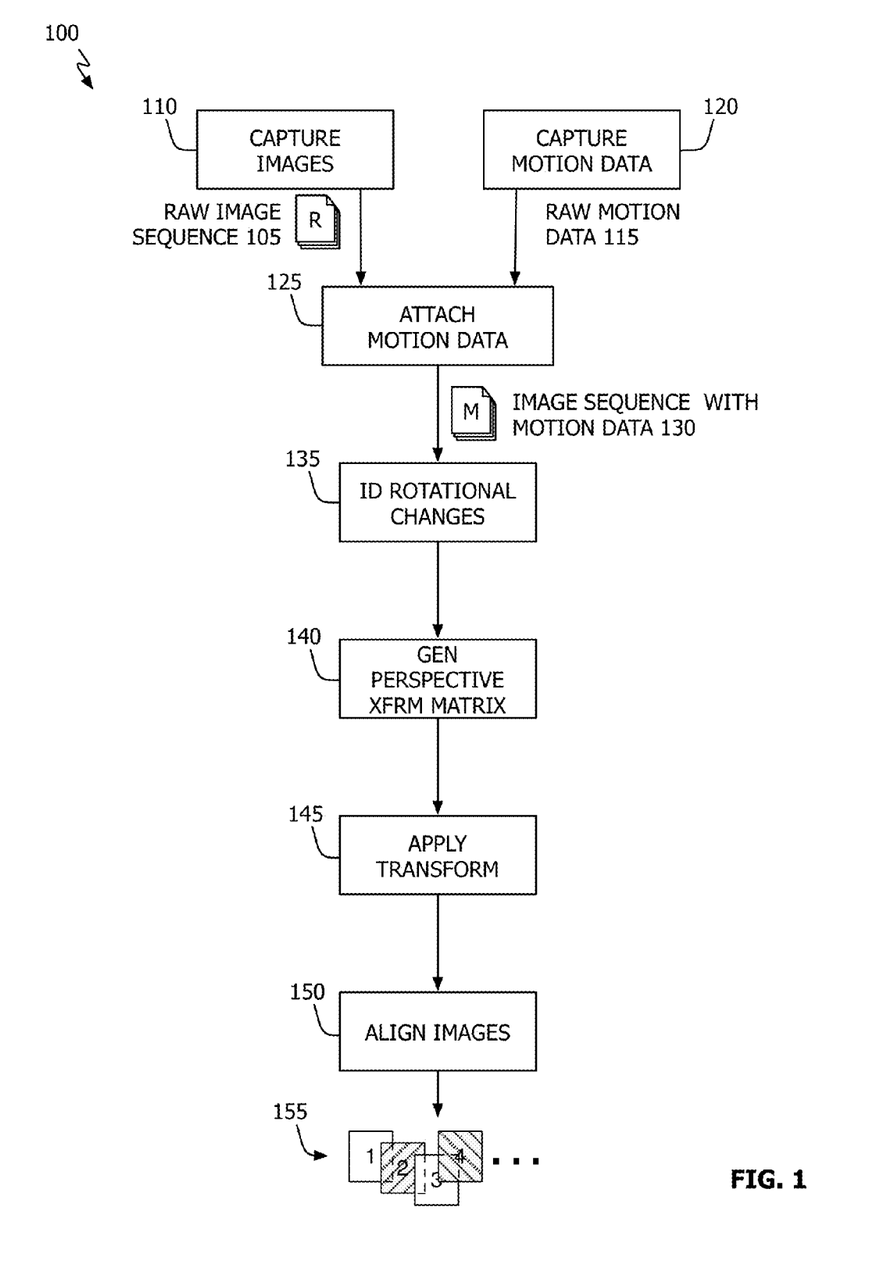
FIG. 1 shows, in flowchart form, an image stitching operation in accordance with one embodiment.

Referring to FIG. 1, image stitching operation 100 in accordance with one embodiment begins by capturing raw image sequence 105 (block 110) and corresponding motion data 115 (block 120). Motion data 115 may then be attached to individual images within raw image sequence 105 (block 125) to produce image sequence 130. It can be advantageous to capture motion data for each image in raw image sequence 105 so that each captured image has a corresponding motion datum. It can also be advantageous, and is common, for each image in an image sequence to have a timestamp indicating when the particular image was captured (e.g., during acts in accordance with block 110). The rotational change between successive images in image sequence 130 may be identified (block 135) and used to generate a perspective transform matrix (block 140). Applying the perspective transform to a "current" image (block 145) allows it to be aligned with a previously captured image (block 150) to produce aligned image sequence 155, a panoramic image.

Figure 2A:
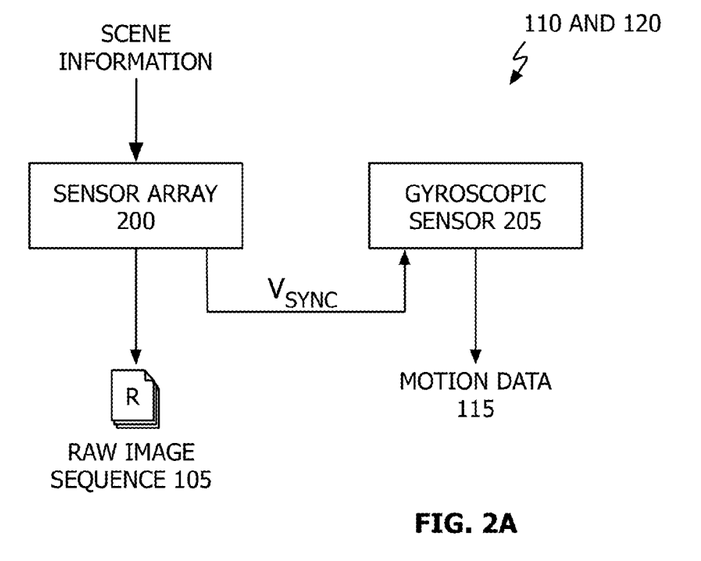
FIGS. 2A and 2B show, in block diagram form, two different embodiments for correlating image data with motion data.

Referring to FIG. 2A, in one embodiment image capture operation 110 may be preformed by sensor array 200 and motion data capture operation 120 may be performed by gyroscopic sensor (gyro) 205. Sensor array 200 may capture black and white or color images and use, for example, complementary metal-oxide semiconductor (CMOS) or charged-coupled device (CCD) technology. Gyro sensor 205 may be used to generate rotation rate data in three dimensions (e.g., (x, y, z) or (pitch, roll, yaw) or in a quaternion system). Gyro sensor 205 may use any desired technology such as micro-electromechanical systems (MEMS) technology.

Figure 2B:
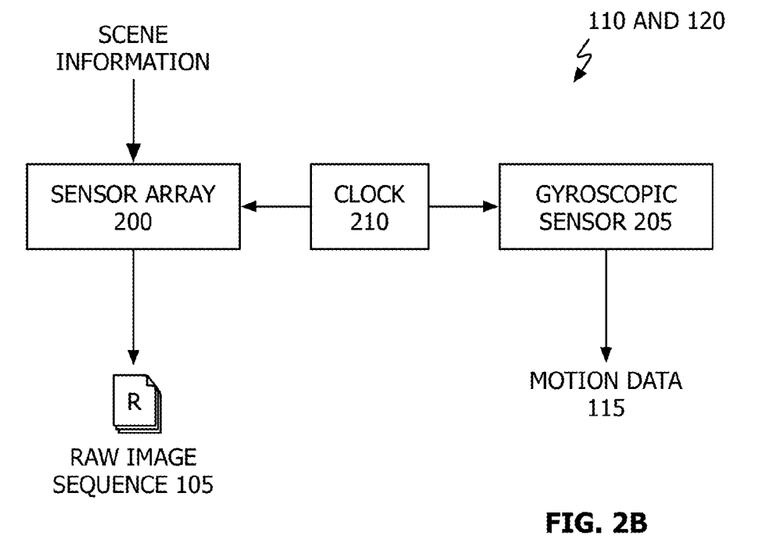

It will be understood that images captured in accordance with block 110 (e.g., by sensor array 200) and motion data captured in accordance with block 120 (e.g., by gyro sensor 205) should be correlated. It is important that an image captured at time $t_0$ be synchronized with motion data captured at substantially the same time. In the embodiment illustrated in FIG. 2A, image sensor 200 may signal gyro sensor 205 each time an image is captured through, for example, the $V_{sync}$ signal. Gyro sensor 205, in turn, may tag each "next captured" motion datum each time a $V_{sync}$ signal is received. This permits each image in raw image sequence 105 to be correlated or associated with the proper motion data. Use of the phrase "next captured" reflects the possibility that motion sensor 205 may operate on a different clock signal than sensor array 200. That is, sensor array 200 and gyro 205 may operate asynchronously. Referring to FIG. 2B, in another embodiment common clock 210 may drive both image sensor array 200 and gyro 205. This arrangement permits the synchronous capture of image and motion data.

Figure 3:
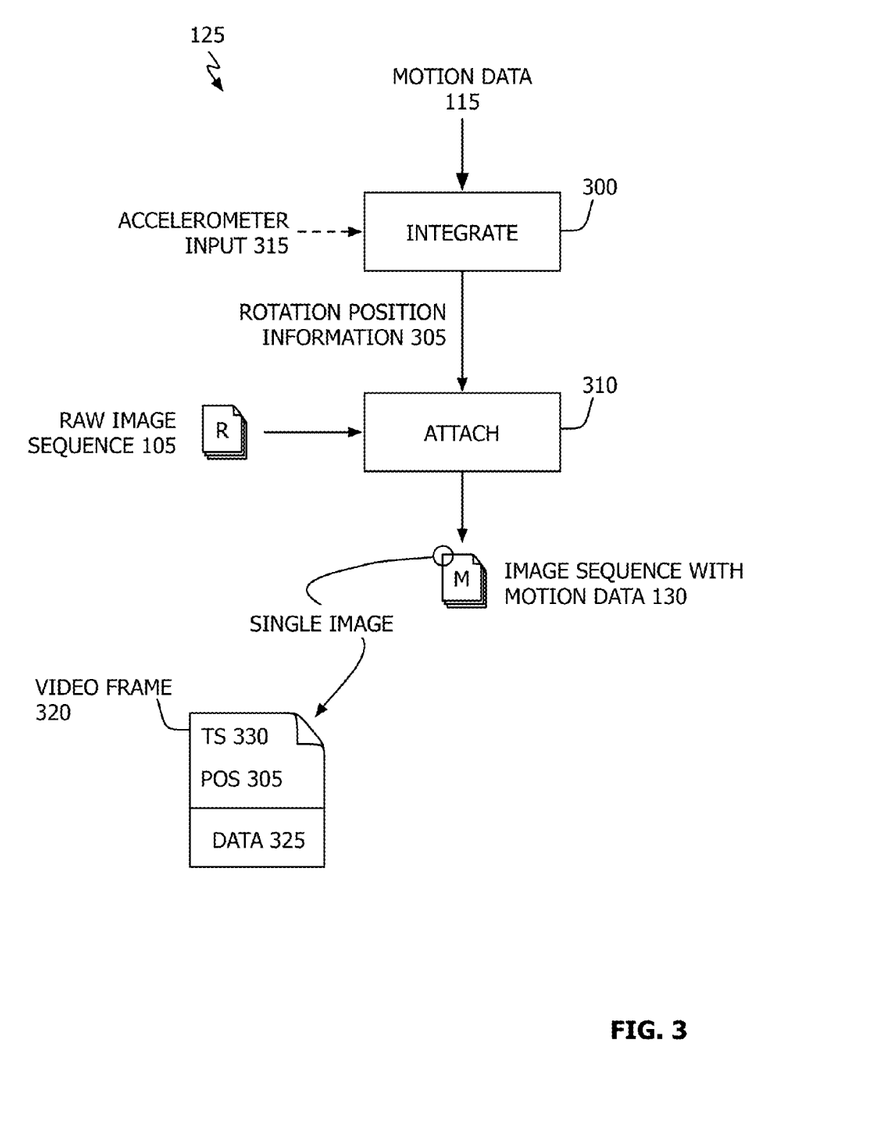
FIG. 3 shows, in flowchart form, motion data being processed and attached to image data in accordance with one embodiment.

Referring to FIG. 3, in one embodiment motion data 115 may be attached to image data (i.e., each image in raw image sequence 105) through process 125. First, it will be understood that when a gyro sensor such as sensor 205 is used to provide motion information 115, what is actually produced is rate information: the rate at which the image capture device is being moved in each of, for example, 3 axis. Rate information may be integrated (block 300) to produce instantaneous rotation position information 305 (also in each of 3 axis). Using image timestamp information each image in raw image sequence 105 may be associated with the appropriate rotation position information 305 (block 310). In another embodiment, operation 125 may also use accelerometer input 315 to assist in calibrating gyro sensor 205's output. Also shown in FIG. 3 is a high-level representation of a single image frame 320 from image sequence 130. As shown, image 320 includes data 325 representing the image itself and timestamp 330 provided during acts in accordance with block 110. After attach operation 310, image 320 may also include position information 305.

Figure 4A:
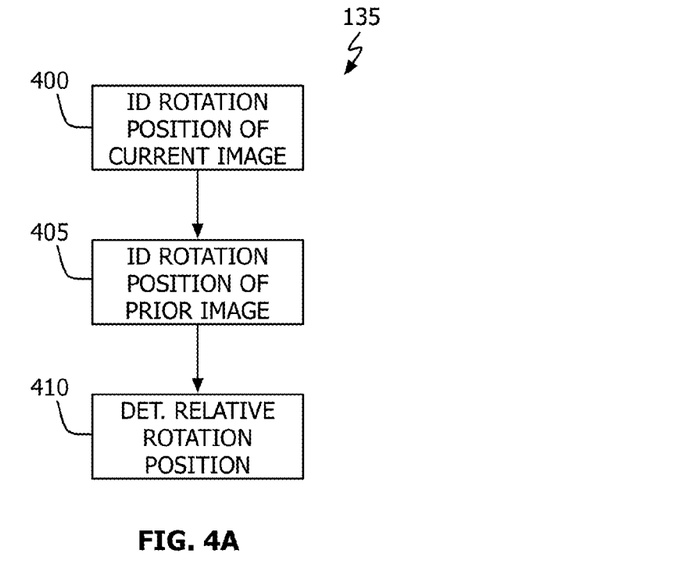
FIGS. 4A and 4B show how rotational information between two images may be determined in accordance with one embodiment.
Figure 4B:
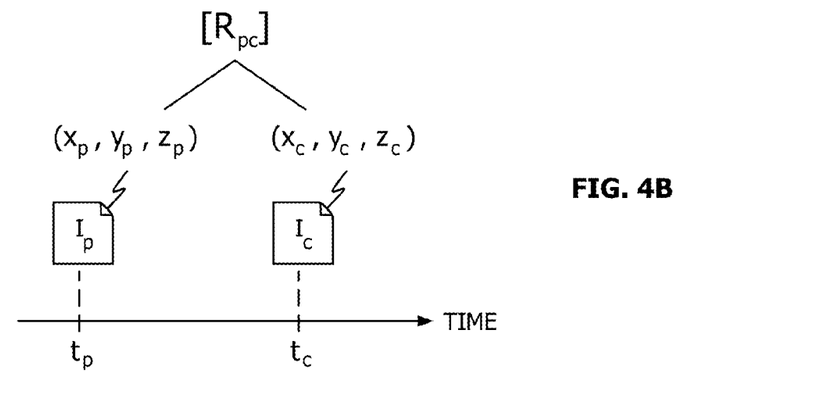

Referring to FIG. 4A, identifying the relative rotation between successive images 135 in accordance with one embodiment begins by identifying the rotation position of the current image (block 400) and the rotation position of a prior image (block 405) upon which rotation for the current image is to be based (e.g., the immediately prior frame). As described above, this information may be attached to each image in accordance with block 125 (see also, FIG. 3). These two positions may be used to determine the rotation of the current image relative to the prior image. This operation may then be repeated for the next image in image sequence 130 and so on. Referring to FIG. 4B, two images from image sequence 130 are shown. Prior image $I_p$ was captured at time $t_p$ and has rotation position information $x_p$, $y_p$, and $z_p$. Current image $I_c$ was taken at time $t_c$ and has rotation position information $x_c$, $y_c$, and $z_c$. The difference between the rotation position of image $I_p$ and image $I_c$ represents the amount of rotation experienced by the image capture unit between time $t_p$ and $t_c$ and can be represented by a 3×3 rotation matrix denoted $[R_{pc}]$ and associated with image $I_c$. It will be recognized that the use of Cartesian coordinates is merely illustrative, any coordinate system may be used. It will also be recognized by those of skill in the art that rotation matrix $[R_{pc}]$ may be generated in accordance with any of a number of techniques but is not, in general, the algebraic difference between the rotation position of image $I_p$ and image $I_c$.

Figure 5:
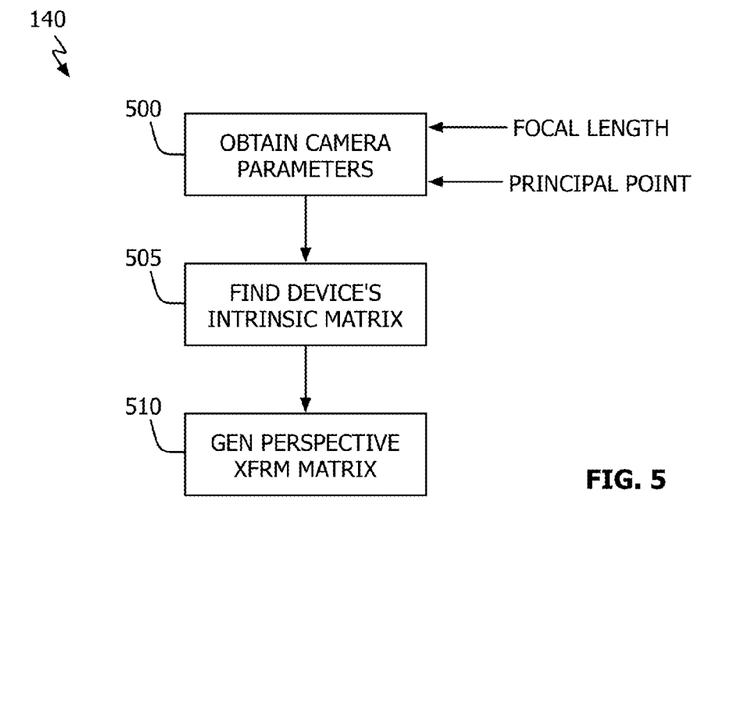
FIG. 5 shows, in flowchart form, a perspective transform matrix generation operation in accordance with one embodiment.

Referring to FIG. 5, a perspective transform for each image in image sequence 130 in accordance with block 140 obtains various parameter values from the image capture device (block 500). Illustrative parameters include the focal length used to capture an image and the image capture device's principal point. It will be recognized that on image capture devices that provide the capability to move their lens and/or image sensor assemblies, the focal length may change from image to image. Based on the obtained parameter values, the device's intrinsic matrix may be found or generated (block 505). It will be understood that an image's intrinsic matrix links the pixel coordinates of an object point with the corresponding coordinates in the image capture device's reference frame. An image's perspective transform matrix may then be generated for a particular image using the image capture device's intrinsic matrix associated with that image (i.e., the intrinsic matrix generated using device parameter values that were in place when the image was captured) and the image's associated rotation matrix (block 510).

A perspective transform matrix for a given image may be derived as follows. First, it will be recognized by those of skill in the art that the 2D projection of real-space (which is 3D) onto a sensor array (which is 2D) may be given as—

$$\begin{pmatrix} x \\ y \\ z \end{pmatrix} = \Pi \begin{pmatrix} X \\ Y \\ Z \end{pmatrix}, \qquad \text{EQ. 1}$$

where $$\begin{pmatrix} X \\ Y \\ Z \end{pmatrix}$$

represents a point in real-space, $\Pi$ represents the image capture device's intrinsic matrix and $$\begin{pmatrix} x \\ y \\ z \end{pmatrix}$$

represents the 2D projection of the real-space point onto the sensor array's plane using homogeneous coordinates. In essence, EQ. 1 represents a 3D-to-2D transformation.

A novel use of this known relationship was to recognize that—

$$\begin{pmatrix} X \\ Y \\ Z \end{pmatrix} = \Pi^{-1} \begin{pmatrix} x \\ y \\ z \end{pmatrix}, \qquad \text{EQ. 2}$$

where $$\begin{pmatrix} x \\ y \\ z \end{pmatrix}$$

is as described above $$\begin{pmatrix} X \\ Y \\ Z \end{pmatrix}$$

represents an estimate of where that point is in real-space, and $\Pi^{-1}$ represents the inverse of the image capture device's intrinsic matrix. Thus, EQ. 2 represents a 3D-to-2D transformation estimator.

Based on the discussion above regarding FIGS. 4A and 4B, it will be recognized that—

$$\begin{pmatrix} X_1 \\ Y_1 \\ Z_1 \end{pmatrix} = [R_{01}] \begin{pmatrix} X_0 \\ Y_0 \\ Z_0 \end{pmatrix}, \qquad \text{EQ. 3}$$

where $$\begin{pmatrix} X_0 \\ Y_0 \\ Z_0 \end{pmatrix}$$

represents the real-space location of a point at time $t_0$ (as reflected in the image captured at time $t_0$), $[R_{01}]$ represents the rotation matrix for image-1 from time $t_0$ (and image $I_0$) to time $t_1$, and $$\begin{pmatrix} X_1 \\ Y_1 \\ Z_1 \end{pmatrix}$$

represents the location of the same point after being rotated as characterized by $[R_{01}]$.

From EQ. 1 we may obtain—

$$\begin{pmatrix} x_1 \\ y_1 \\ z_1 \end{pmatrix} = \Pi_1 \begin{pmatrix} X_1 \\ Y_1 \\ Z_1 \end{pmatrix}, \qquad \text{EQ. 4}$$

where $\Pi_1$ represents the image capture device's intrinsic matrix at time $t_1$. Substituting EQ. 3 into EQ. 4 yields—

$$\begin{pmatrix} x_1 \\ y_1 \\ z_1 \end{pmatrix} = \Pi_1 [R_{01}] \begin{pmatrix} X_0 \\ Y_0 \\ Z_0 \end{pmatrix}. \qquad \text{EQ. 5}$$

From EQ. 2, we have—

$$\begin{pmatrix} X_0 \\ Y_0 \\ Z_0 \end{pmatrix} = \Pi_0^{-1} \begin{pmatrix} x_0 \\ y_0 \\ z_0 \end{pmatrix}. \qquad \text{EQ. 6}$$

Substituting EQ. 6 into EQ. 5 gives—

$$\begin{pmatrix} x_1 \\ y_1 \\ z_1 \end{pmatrix} = \Pi_1 [R_{01}] \Pi_0^{-1} \begin{pmatrix} x_0 \\ y_0 \\ z_0 \end{pmatrix}, \qquad \text{EQ. 7}$$

which may be rewritten as—

$$\begin{pmatrix} x_1 \\ y_1 \\ z_1 \end{pmatrix} = [P_{01}] \begin{pmatrix} x_0 \\ y_0 \\ z_0 \end{pmatrix}, \qquad \text{EQ. 8}$$

where $[P_{01}]$ represents the perspective transform matrix for image-1. Equations 7 and 8 describe how a point in an image captured at time $t_0$ moved to a new position at time $t_1$ due to rotation of the image capture device as represented by rotation matrix $[R_{01}]$. (It is also noted $[P_{01}]$ incorporates the image capture device's parameters (e.g., focal length) at times $t_0$ and $t_1$.) It is significant to note, perspective transform $[P_{01}]$ permits alignment of image-1 with image-0 without any image processing operations (i.e., analysis and/or registration). More particularly, perspective transform $[P_{01}]$ is based solely on the image capture device's parameter values (e.g., focal length) and rotational information (e.g., from a gyro) for each image. It will be recognized that this information is computationally inexpensive to obtain and process, allowing image stitching operations in accordance with this disclosure to be performed quickly and at low computational cost. This, in turn, may support high image capture rates. It is also noted that the methodologies disclosed herein may be used to complement traditional image registration methods.

Figure 6:
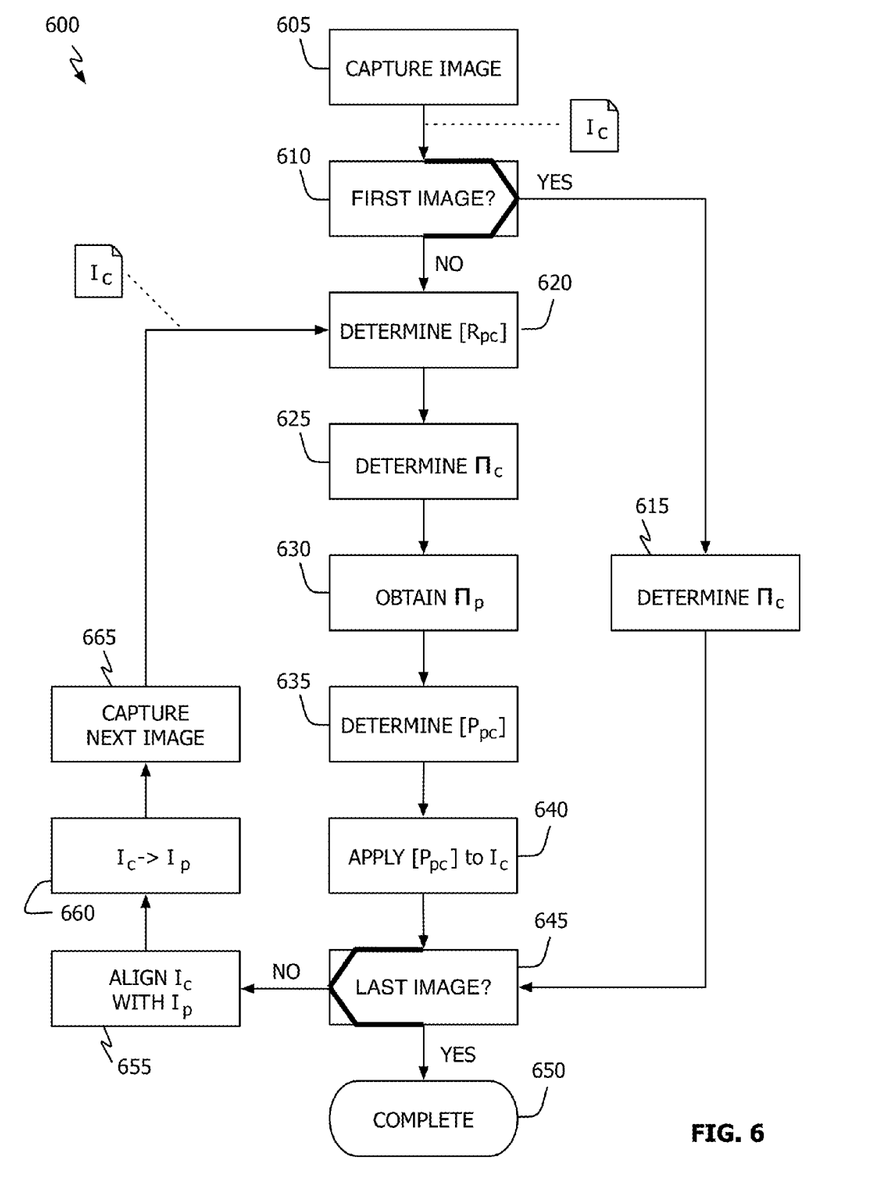
FIG. 6 shows, in flowchart form, an image stitching operation in accordance with another embodiment.

Referring to FIG. 6, the above operations may be reviewed in accordance with one embodiment as image stitching operation 600. As shown, operation 600 begins when a first image is captured (block 605). As noted, this image may be designated as the current image, $I_C$. If current image $I_C$ is the first image in an image sequence such as raw image sequence 105 (the "YES" prong of block 610), the image's associated intrinsic matrix $\Pi_c$ is determined, whereafter processing continues at block 645. If current image $I_C$ is not the first image in an image sequence (the "NO" prong of block 610), rotation matrix $[R_{pc}]$ between current image $I_c$ and prior image $I_p$ may be determined (block 620). Next, the image capture device's intrinsic matrix is obtained corresponding to current image $I_C$, $\Pi_c$ (block 625). The intrinsic matrix associated with prior image $I_p$ may then be obtained, $\Pi_p$ (block 630) and perspective transform matrix $[P_{pc}]$ determined (block 635) and applied to each pixel in current image $I_c$ (block 640). If current image $I_c$ is the last image in an image sequence (the "YES" prong of block 645), the last image (i.e., current image $I_c$) may be aligned with prior image $I_p$ in the image sequence whereafter stitching operation 600 is complete (block 650). If current image $I_c$ is not the last image in the image sequence (the "NO" prong of block 645), current image $I_c$ may be aligned with prior image $I_p$ in the image sequence (block 655), whereafter current image $I_c$ is made the prior image $I_p$ (block 660). A next image may be captured (block 665) which becomes the current image $I_c$ and processing continues at block 620.

Figure 7:
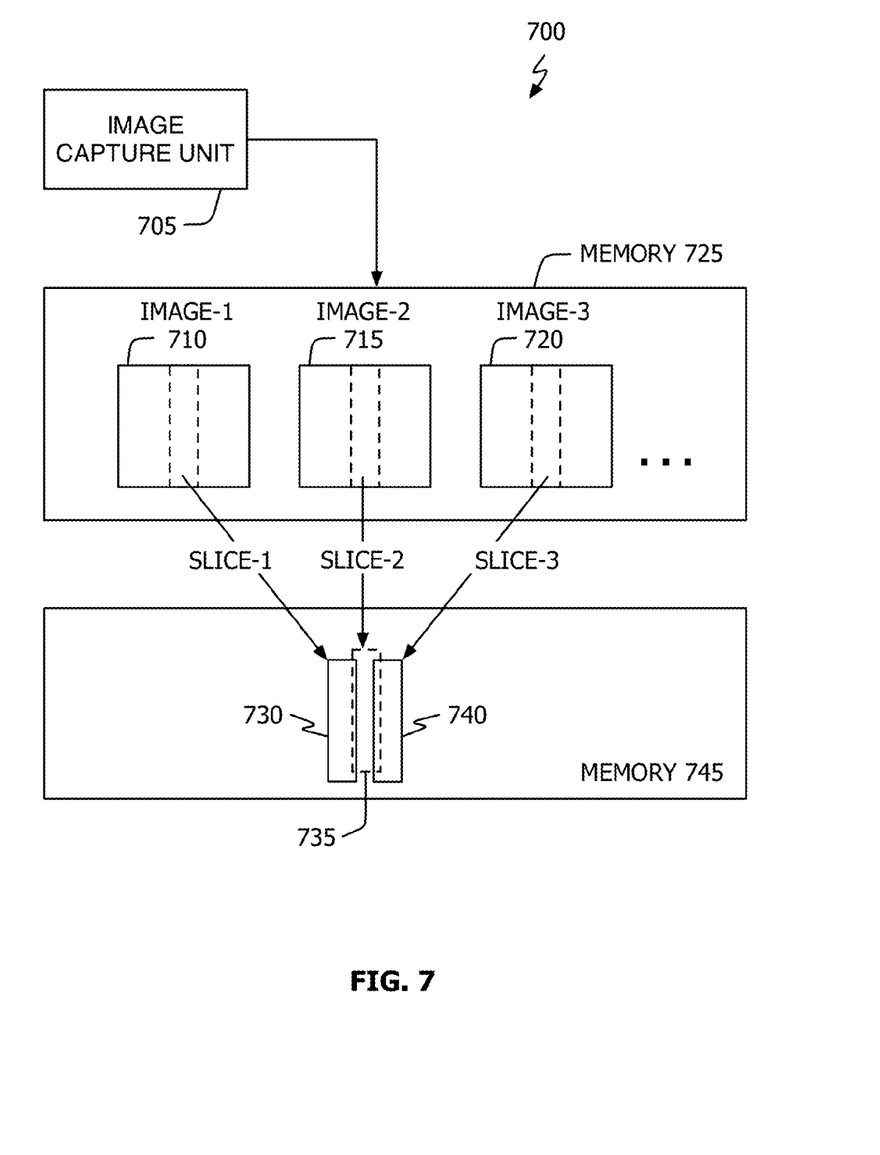
FIG. 7 shows, in block diagram form, an image capture device in accordance with one embodiment.

Image stitching operations have, so far, been described in terms of whole images. That is, a first image stitched to, or aligned with, another image. The disclosed techniques, however, are equally applicable to portions of images. Referring to FIG. 7, electronic device 700 may include image capture unit 705 which can deliver a sequence of images (e.g., images 710, 715 and 720) to first memory 725. A portion or slice of each image (e.g., slices 730, 735 and 740) may be extracted from each image, placed into second memory 745, and aligned or stitched as disclosed herein. It will be recognized that memory 725 and memory 740 may be different regions within a common physical memory or wholly separate memories. It should also be recognized that it is not necessary to stitch whole images or partial images only. A whole image may be aligned with a portion of a second image which, in turn, may be aligned with another slice or whole image.

Figure 8:
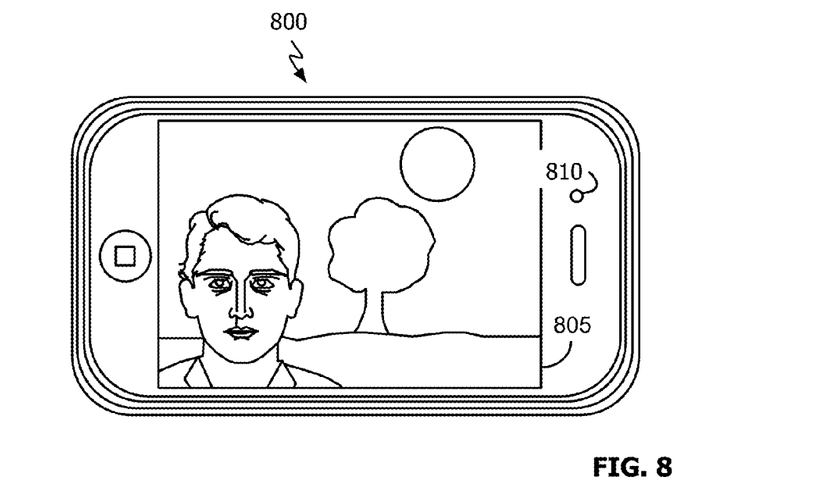
FIG. 8 shows an illustrative electronic device incorporating image stitching capability in accordance with this disclosure.

Referring to FIG. 8, one electronic device incorporating digital image stitching capability in accordance with this disclosure is shown. In this particular example, device 800 represents a mobile telephone which provides preview or capture display 805. Mobile telephone 800 also includes microphone 810 and one or more speakers (not shown). It will be recognized that the disclosed image stitching capability may be incorporated in many electronic devices. Examples include, but are not limited to, stand-alone digital electronic cameras, mobile music players, personal digital assistants (PDAs), and notebook, desktop and tablet computers.

Figure 9A:
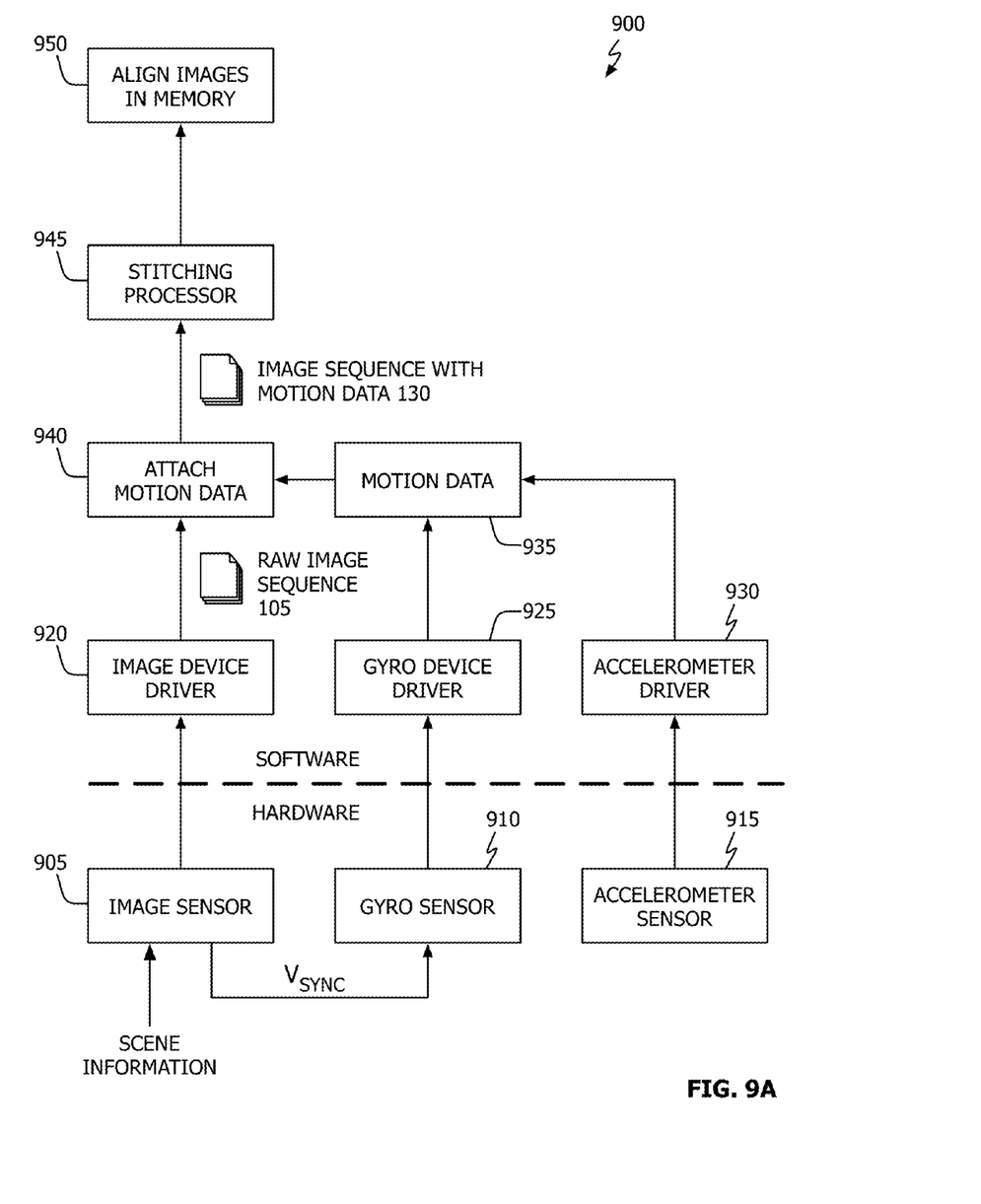
FIGS. 9A and 9B show, in a functional block diagram, two illustrative devices capable of performing image stitching in accordance with this disclosure.

Referring to FIG. 9A, a functional view of illustrative electronic device 900 in accordance with this disclosure includes image sensor 905, gyroscopic sensor 910, and accelerometer 915. Image sensor 905 provides images to image device driver 920, gyro sensor 910 provides motion data (e.g., rate of movement) to gyro device driver 925, and accelerometer 915 provides its data to accelerometer driver 930. In the example of FIG. 9A, images and motion data are correlated through the use of a $V_{sync}$ signal as discussed above with respect to FIG. 2A. Gyro and accelerometer data may be collected to generate motion data 935 which may then be attached 940 to individual images within raw image sequence 105. Once motion data has been attached, augmented image sequence 130 may be sent to stitching processor 945 which transforms each image in accordance with its particular perspective transform matrix so that it may be aligned with prior images in memory 950.

Figure 9B:
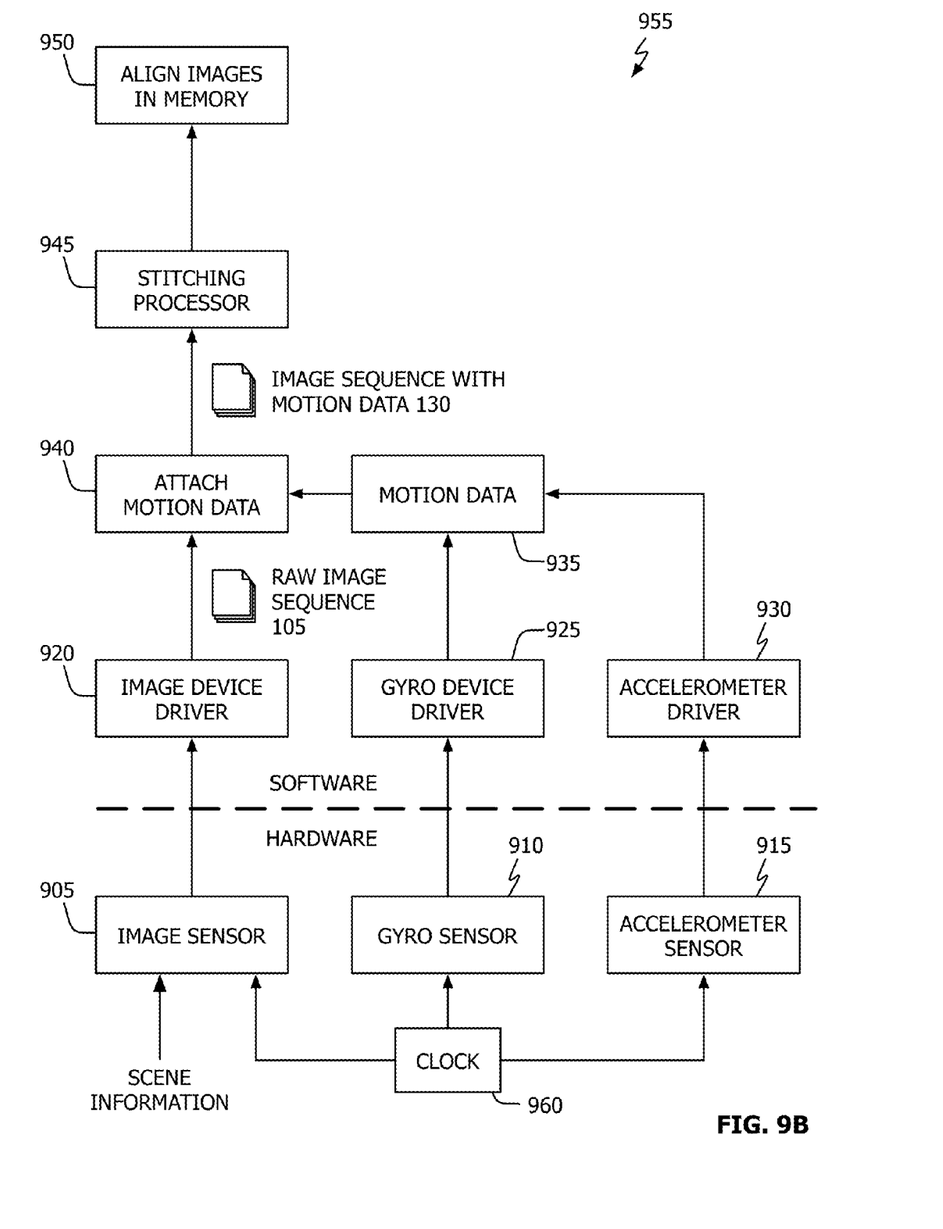

Referring to FIG. 9B, another illustrative image capture device 955 is shown. In this embodiment, however, common clock 960 drives image 905, gyro 910 and accelerometer 915 sensors. As noted above with respect to FIG. 2B, use of common clock 960 permits synchronous capture of image and motion data.

Figure 10:
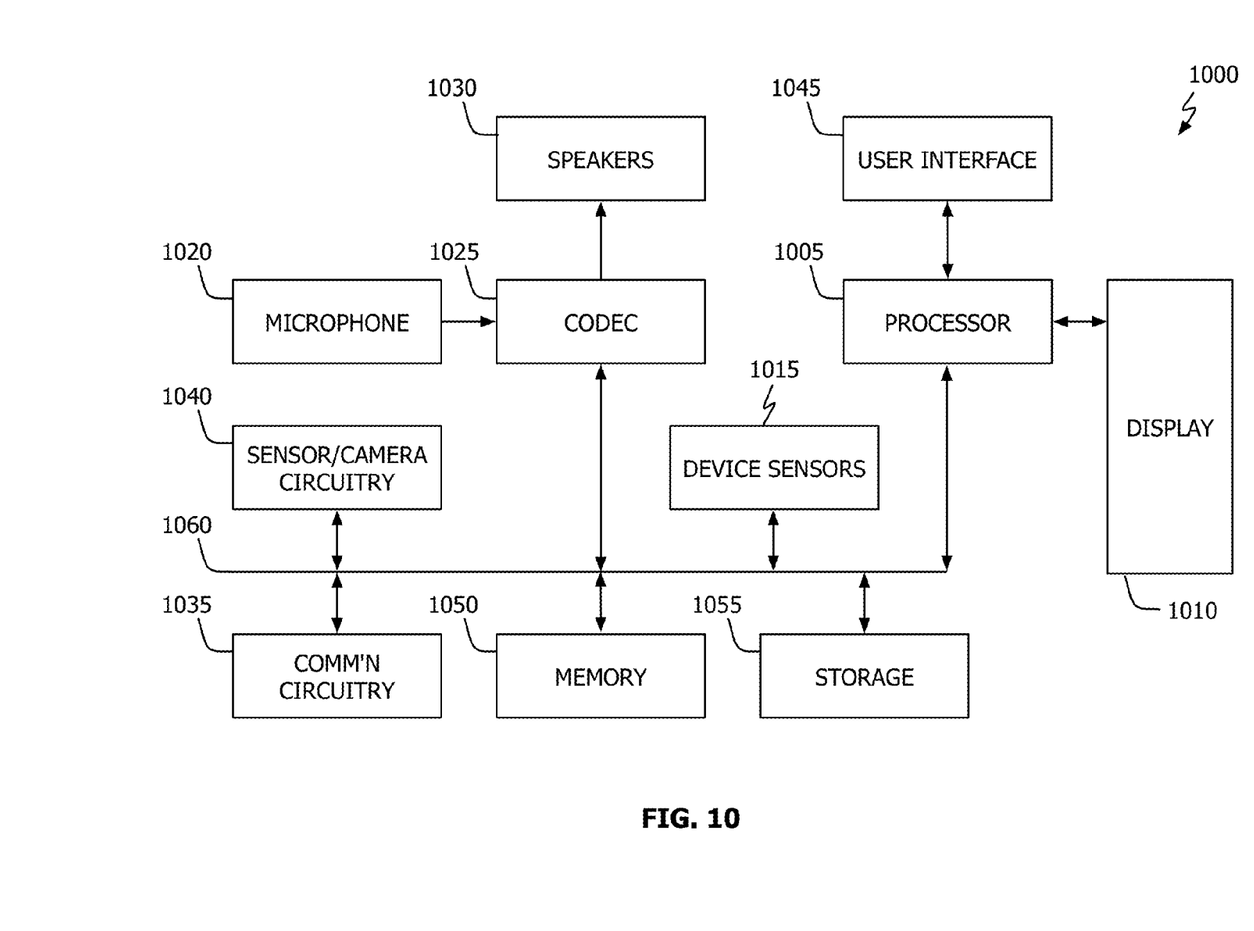
FIG. 10 shows, in block diagram form, an electronic device in accordance with one embodiment.

Referring now to FIG. 10, a simplified functional block diagram of representative electronic device 1000 incorporating digital image stitching capability is shown according to one embodiment. Electronic device 1000 may include processor 1005, display 1010, device sensors 1015 (e.g., gyro, accelerometer, proximity, and ambient light sensors), microphone 1020, audio/video codecs 1025, speaker 1030, communications circuitry 1035, image sensor with associated camera and video hardware 1040, user interface 1045, memory 1050, storage device 1055, and communications bus 1060.

Processor 1005 may be any suitable programmable control device and may control the operation of many functions, such as the generation and/or processing of image metadata, as well as other functions performed by electronic device 1000. Processor 1005 may drive display 1010 and may receive user input from user interface 1045. An embedded processor, such a Cortex® A8 with the ARM® v7-A architecture, may provide a versatile and robust programmable control device that may be utilized for carrying out the disclosed techniques. (CORTEX® and ARM® are registered trademarks of the ARM Limited Company of the United Kingdom.)

Memory 1050 may include one or more different types of storage media used by processor 1005 to perform device functions. Memory 1050 may include cache, read-only memory (ROM), and/or random access memory (RAM). Communications bus 1060 may provide a data transfer path for transferring data to, from, or between at least storage device 1055, memory 1050, processor 1005, and camera circuitry 1040. User interface 1045 may allow a user to interact with electronic device 1000 through a variety of forms, such as a button, keypad, dial, click wheel, or a touch screen.

Non-transitory storage device 1055 may store media (e.g., image and video files), computer program instructions or software, preference information, device profile information, and any other suitable data. Storage device 1055 may include one more storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Software may be organized into one or more modules and be written in any suitable computer programming language (or more than one language). When executed by, for example, processor 1005 such computer program code or software may implement one or more of the methods described herein. Each module may be stored in a different storage device or memory and may be executed by one or more processors.

Various changes in the materials, components, circuit elements, as well as in the details of the illustrated operational methods are possible without departing from the scope of the following claims. For instance, processor 1005 may be implemented using two or more program control devices or processing units communicatively coupled. Each program control device may include the above-cited processors, special purpose processors such as graphics processing units (GPUs) and custom designed state machines that may be embodied in a hardware device such as an application specific integrated circuit (ASIC) or a field programmable gate array (FPGA).

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory storage device, comprising computer code which, when executed by a computer of an image capture device, causes the computer to:
   align a sequence of images by, on a paired basis:
      capturing a first image of a respective image pair at the image capture device, wherein the first image has first image capture parameters;
      capturing first motion data for the first image;
      capturing a second image of the respective image pair at the image capture device, wherein the second image has second image capture parameters;
      capturing second motion data for the second image;
      deriving a single perspective transform from the first and the second image capture parameters and from a relative rotation between the first and second images indicated by the first and second motion data; and
      applying the single perspective transform to a segment of the second image, wherein the perspective transform, when applied, maps points in the second image to corresponding points in the first image, in accordance with a difference in perspective of the first and the second images; and
   stitch the aligned segments together to form a composite image.

2. The non-transitory storage device of claim 1, wherein the computer code causes the computer to:
   capture the first motion data at the image capture device at substantially the same time as the first image is captured;
   determine position information for the first image based on the first motion data; and
   associate the position information for the first image to the first image.

3. The non-transitory storage device of claim 2, wherein the computer code causes the computer to:
   capture gyroscopic sensor data; and
   determine the position information by integrating the gyroscopic sensor data.

4. The non-transitory storage device of claim 1, wherein the computer code causes the computer to capture the first and second motion data from a gyroscopic sensor.

5. The non-transitory storage device of claim 1, wherein the computer code causes the computer to:
   calculate a first intrinsic matrix for the first image based on the first image capture parameters; and
   calculate a second intrinsic matrix for the second image based on the second image capture parameters;
   wherein each intrinsic matrix represents a mapping from a three-dimensional space to a two-dimensional space associated with a reference frame of the image capture device.

6. The non-transitory storage device of claim 5, wherein the computer code causes the computer to derive a perspective transform matrix for the second image based on the first and second intrinsic matrices and the relative rotation between the first and second images.

7. The non-transitory storage device of claim 6, wherein the computer code causes the computer to apply the perspective transform matrix as the single perspective transform.

8. A digital image stitching method, comprising:
   aligning a sequence of images by, on a paired basis:
      capturing a first image of a respective image pair at an image capture device, wherein the first image has first image capture parameters;
      capturing first motion data for the first image;
      capturing a second image of the respective image pair at the image capture device, wherein the second image has second image capture parameters;
      capturing second motion data for the second image;
      deriving a single perspective transform from the first and the second image capture parameters and from a relative rotation between the first and second images indicated by the first and second motion data; and
      applying the single perspective transform to a segment of the second image, wherein the perspective transform, when applied, maps points in the second image to corresponding points in the first image, in accordance with a difference in perspective of the first and the second images; and
   stitching the aligned segments together to form a composite image.

9. The method of claim 8, wherein the act of capturing first motion data for the first image comprises:
   capturing the first motion data at the image capture device at substantially the same time as the first image is captured;
   determining position information for the first image based on the first motion data; and
   associating the position information for the first image to the first image.

10. The method of claim 9, wherein:
    the first motion data is captured using gyroscopic sensor data; and
    the position information is determined by integrating the gyroscopic sensor data.

11. The method of claim 8, wherein the first and second motion data are captured by a gyroscopic sensor of the image capture device.

12. The method of claim 8, further comprising:
calculating a first intrinsic matrix for the first image based on the first image capture parameters; and
calculating a second intrinsic matrix for the second image based on the second image capture parameters;
wherein each intrinsic matrix represents a mapping from a three-dimensional space to a two-dimensional space associated with a reference frame of the image capture device.

13. The method of claim 12, further comprising deriving a perspective transform matrix for the second image based on the first and second intrinsic matrices and the relative rotation between the first and second images.

14. The method of claim 13, further comprising applying the perspective transform matrix as the single perspective transform.

15. A digital image capture device having one or more image capture parameters, comprising:
an image sensor;
a motion sensor operatively coupled to the image sensor;
a memory operatively coupled to the image and motion sensors; and
a programmable control device communicatively coupled to the image sensor, the motion sensor and the memory, the programmable control device adapted to execute computer code stored in the memory, wherein when executed the computer code causes the control device to:
align a sequence of images by, on a paired basis:
capturing a first image of a respective image pair at the image capture device, wherein the first image has first image capture parameters,
capturing first motion data from the motion sensor for the first image,
capturing a second image of the respective image pair at the image capture device, wherein the second image has second image capture parameters,
capturing second motion data from the motion sensor for the second image,
deriving a single perspective transform from the first and the second image capture parameters and from a relative rotation between the first and second images indicated by the first and second motion data, and
applying the single perspective transform to a segment of the second image, wherein the perspective transform, when applied, maps points in the second image to corresponding points in the first image, in accordance with a difference in perspective of the first and the second images, and
stitch the aligned segments together to form a composite image.

16. The digital image capture device of claim 15, wherein the programmable control device comprises a plurality of communicatively coupled processing units.

17. The digital image capture device of claim 15, wherein the computer code causes the control device to:
capture the first motion data from the digital image capture device at substantially the same time as the first image is captured;
determine position information for the first image based on the first motion data; and
associate the position information for the first image to the first image.

18. The digital image capture device of claim 17, wherein the motion sensor comprises a gyroscopic sensor and the computer code causes the control device to integrate the gyroscopic sensor data.

19. The digital image capture device of claim 15, wherein the computer code causes the control device to capture the first and second motion data from a gyroscopic sensor.

20. The digital image capture device of claim 15, wherein the computer code causes the control device to:
calculate a first intrinsic matrix for the first image based on the first image capture parameters; and
calculate a second intrinsic matrix for the second image based on the second image capture parameters;
wherein each intrinsic matrix represents a mapping from a three-dimensional space to a two-dimensional space associated with a reference frame of the image capture device.

21. The digital image capture device of claim 20, wherein the computer code causes the control device to derive a perspective transform matrix for the second image based on the first and second intrinsic matrices and the relative rotation between the first and second images.

22. The digital image capture device of claim 21, wherein the computer code causes the control device to apply the perspective transform matrix as the single perspective transformation.

23. A non-transitory storage device, comprising computer code, which when executed by a computer of an image capture device causes the computer to:
align a sequence of images by, on a paired basis:
capturing a first image of a respective image pair at the image capture device and at a first time, wherein the first image has first image capture parameters;
calculating a first intrinsic matrix for the first image based at least in part on the first image capture parameters; and
capturing first motion data for the first image, at substantially the first time, from a gyroscopic sensor;
capturing a second image at the image capture device and at a second time, wherein the second image has second image capture parameters;
calculating a second intrinsic matrix for the second image based at least in part on the second image capture parameters;
capturing second motion data for the second image, at substantially the second time, from the gyroscopic sensor;
determining a relative motion between the first and second images based on the first and second motion data, wherein the relative motion includes a relative rotation between the first and second images;
deriving a single perspective transform matrix for the second image from the first and second intrinsic matrices and the relative rotation between the first and second images, wherein each intrinsic matrix represents a mapping from a three-dimensional space to a two-dimensional space associated with a reference frame of the image capture device; and
applying the single perspective transform matrix to a perspective transformation of the second image, wherein the perspective transform matrix, when applied, maps points in the second image to corresponding points in the first image, in accordance with a difference in perspective of the first and the second images; and
stitch the aligned first and second images together to form a composite image.

24. The non-transitory storage device of claim 23, wherein the computer code is adapted to be executed by two or more programmable control devices.

* * * * *